United States Patent Office 3,218,131
Patented Nov. 16, 1965

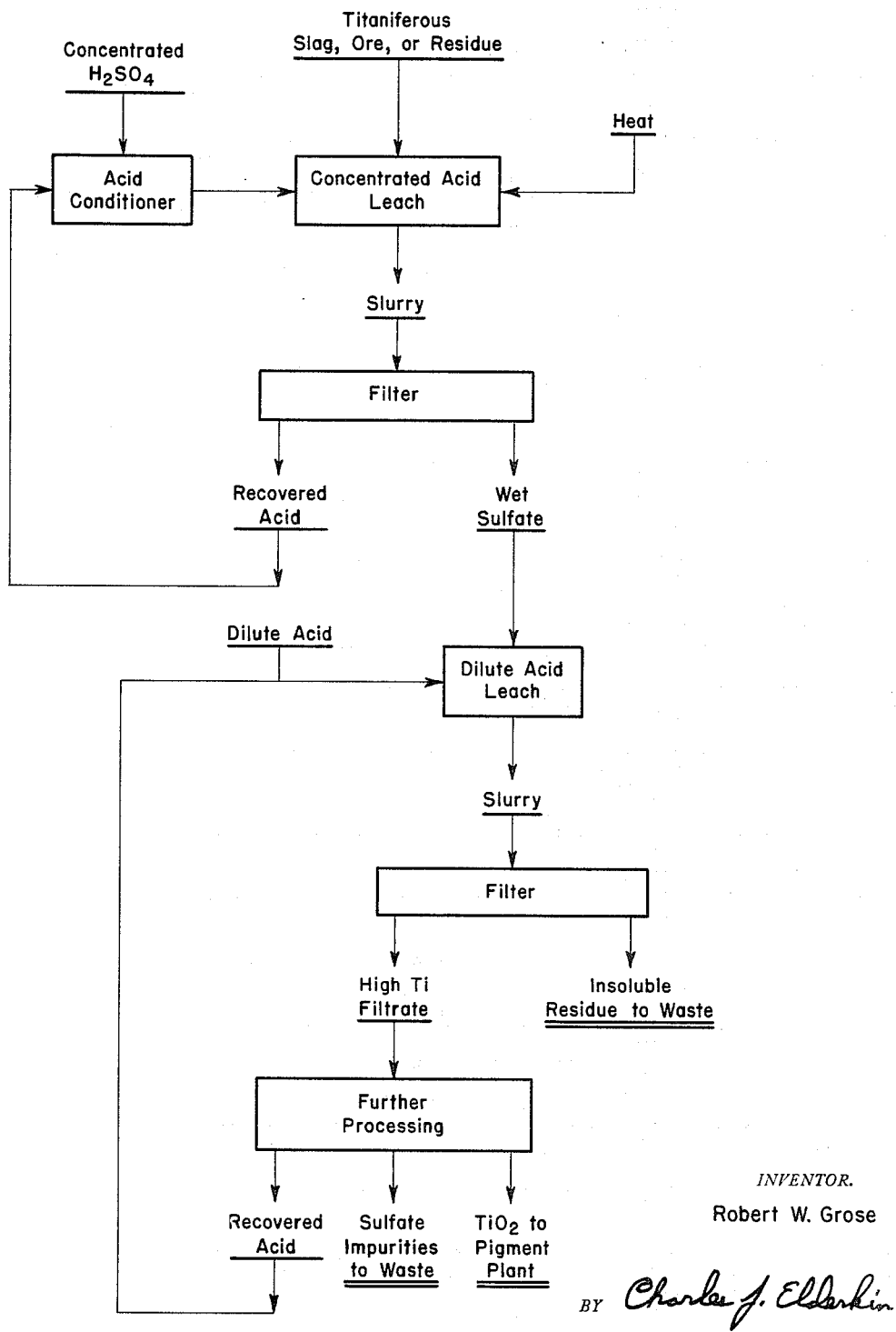

3,218,131
PROCESS FOR RECOVERY OF TITANIA VALUES
Robert W. Grose, Sanborn, N.Y., assignor, by mesne assignments, to Independence Foundation, Philadelphia, Pa., a corporation of Delaware, and Koppers Company, Inc., Pittsburgh, Pa., a corporation of Delaware
Filed Jan. 27, 1961, Ser. No. 85,245
12 Claims. (Cl. 23—202)

This invention relates to metallurgy, in general, and more particularly to the extraction of titania from ores and slags. The invention has for its principal object the provision of a process whereby titania may be extracted from complex materials of the class described in an efficient and economical manner through the expedient of a double-leaching operation in which the normal cracking step characteristic of known processes of a similar nature is eliminated.

Processes for the extraction of titania from ores and slags are largely based on the fact that concentrated sulfuric acid will react with such materials, forming a titanium sulfate precipitate which is soluble in dilute acid or water. Conventional commercial processes utilize raw materials which may contain anywhere from 20% to 90% $TiO_2$, and which are initially ground to a suitable degree of fineness. The ground ore or slag is placed in a cracking tank with approximately the stoichiometric quantity of concentrated (80–105%) sulfuric acid, and held therein for from two to three (2–3) hours at a temperature of from 300° to 325° C. The reaction products comprise a dry anhydrous or acid sulfate cake, and water and sulfur oxide vapors. The latter gases are directed to a gaseous acid recovery system and are thereafter recycled. The anhydrous or acid sulfate cake is subsequently leached with dilute sulfuric acid or water, which functions to dissolve the titanium and iron sulfates, leaving an insoluble, high-silica residue. Before separating the titanium-bearing solution from the residue, it is common to treat the solution with a reductant such as aluminum or sulfur dioxide to reduce and render insoluble the iron in the solution. Sufficient acid must be present during the leaching step to prevent hydrolysis of the titanium sulfate. After filtering, the titanium-bearing solution is further purified, clarified, hydrolyzed, and crystallized, resulting in the final production of pigment grade titania. Acid in the filtrate is recovered and recycled to the dilute acid leaching step. The total recovery of titania values normally ranges from about 85 to 90%.

While the foregoing process steps represent what might be considered normal commercial practice, the literature contains reference to a great many variations thereof, reflecting the efforts of numerous investigators towards increased extraction, lower acid consumption, and other stepwise improvements in the efficiency and economy of the basic process. Thus, one prior investigator advocates a step-wise addition of acid to produce the dry cake, another heats to fusion, and yet another digests at a low temperature (100°–150° C.) for a long period of time, thereafter dissolving the mass of sulfate in a large volume of water.

All of the previous investigators have considered it necessary to allow the initial cracking or digestion step to "go to completion," which, under the severe dehydrating conditions present, involves going to an anhydrous or acid salt cake which subsequently has to be dissolved in acid or boiling water. My invention resides, in part, in the discovery that the conventional cracking step may be eliminated by a much faster and cheaper concentrated acid leaching step which is carried out in the presence of a large excess of acid maintained at or below its boiling point to produce a sulfate slurry. This slurry may be readily separated from the acid by a simple filtering step, which allows the recovered acid to be recycled directly, thereby eliminating the cost of the conventional gaseous acid-recovery installation. The filtered solids, believed to be a hydrated normal salt, are much more amenable to the dilute acid leaching step, requiring only about half as much time for dissolution of the titanium salts as the conventional process, and recovery is substantially higher, generally in the range of from 97 to 99%. Further processing, i.e. purification, clarification, hydrolysis, etc., is effected in conventional manner.

While it has been suggested heretofore that one may perform the initial step of the process below the boiling point of the acid, the advantage of my invention resides in utilizing these low temperatures in the presence of a very substantial excess of acid. The amount of acid used will vary from material to material, but in general is the minimum amount necessary to complete the sulfation while leaving an easily filterable slurry. With many materials twice the stoichiometric amount of acid performed excellently. In contrast to the conventional cracking step, which takes two to three hours at 300°–325° C., I prefer to leach in concentrated acid for only about three quarters of an hour to one hour at about 200°–230° C., after which the resulting slurry is ready to filter. Also, whereas the conventional process requires at least one hour at over 100° C. in order for the dilute leach to dissolve the contained titanium in the dry cake, the wet sulfate slurry recovered from the filtering operation of my invention requires only about one-half hour at about 80° C. to completely dissolve the titanium. Lastly, the recoveries of titania from the process of my invention are significantly higher than those reported by previous investigators.

It is believed that a better knowledge of the process of my invention may be had by referring to the following detailed description of the same, taken in conjunction with the single drawing, which consists of a flow sheet or flow diagram depicting the various steps of a preferred embodiment of the process. In the initial leaching step, an excess of acid is added such that the resulting slurry will have the property of easy filtration; i.e. have a low viscosity. For many slags this is accomplished in a practical manner by adding four (4) parts of acid to each part of ore or slag, thereby making an acid:titania ratio of less than 4:1 a physical impossibility. With low-grade materials, of course, the ratio is actually much higher than this, but this is regarded as unimportant for relatively small-scale operations. In a large-scale operation the amount of acid added would be regulated by the grade of the particular material being processed.

While the time necessary to complete the concentrated acid leaching step is bound to be a function of the degree of comminution to which the raw material has been subjected, it has been found that three-quarters of an hour is usually sufficient to treat material that has been ground to —100 mesh. With certain of the less-reactive titanium-bearing minerals and slags it is found desirable to continue the leaching for two or three hours if consistently high recovery is to obtained. Generally, it is found that a 1½ hour leach yields results from 2 to 3% better than a three-quarter hour treatment, in terms of recovered titania. The question of whether it is worthwhile to double the amount of "in process" time at this stage in order to go from 96% recovery to 98%, however, is one which must be determined according to the economics of a particular installation.

After leaching in concentrated acid, the resulting slurry is filtered or centrifuged to separate most of the acid from the insoluble sulfates. The separated filtrate, containing less than one percent (1%) titania, is recycled to an acid conditioner to adjust concentration and guard against impurity buildup. It can thereafter be stored or used directly in the concentrated acid leach tank. The wet insoluble sulfates are not washed and therefore contain some free acid. The upper limit for the temperature of the dilute acid leach is the boiling point, as it has been shown that, nothing is gained by using pressure to get beyond the boiling point. The lowest temperature tried was 80° C., but on a different scale of operations, a lower temperature might suffice. It has been found that there is usually enough acid mixed with the sulfates to raise the temperature thereof sufficiently upon reaction with the water used for leaching, so that little or no added heat is required for this stage of the process. The use of dilute sulfuric acid or water in the dilute leaching step is predicated on the amount of residual acid in the wet sulfate. To prevent hydrolysis, the acid: titania ratio should be kept above 2:1, and acid is therefore added to the leach water in amounts sufficient to maintain this ratio. If ferric iron ($Fe^{+++}$) is present in the resultant slurry, this can be reduced to insoluble ferrous iron ($Fe^{++}$) by addition of any suitable reductant such as scrap, sulfur dioxide, etc., before the slurry is filtered.

A second filtration step separates the titania-bearing filtrate from the insoluble high-silica residue. To insure as complete a separation as possible, the residue is washed with hot water before discarding; the water thereafter being added to the filtrate.

Once the titanium-bearing solution is obtained, the process follows conventional lines for the recovery of titania. This usually involves purification and clarification of the solution to remove small amounts of undesired elements, followed by hydrolysis and crystallization of hydrated $TiO_2$. Recovered acid is recycled to the dilute acid leaching step, and the recovered hydrated $TiO_2$ is sent on for processing into pigment grade titania.

High-titania slags form an important source of raw materials for pigment production, and the analysis of three such slags are included in Table I, as it is believed that this will be of assistance in understanding the following examples which further illustrate the principles and procedures of my invention.

TABLE I.—ANALYSIS OF TITANIA-BEARING MATERIALS

|  | Slag 1 | Slag 1 | Slag 3 |
|---|---|---|---|
| $TiO_2$ (some $Ti_2O_3$) | 72.0–74.5 | 51.92 | 62.85 |
| Fe (as FeO) | 11.01 | 4.21 | 5.05 |
| CaO |  | 1.32 | 1.14 |
| MgO | 5.16 | 4.17 | 9.66 |
| V |  |  | 0.40 |
| $SiO_2$ | 4.32 | 9.38 | 4.68 |
| $Al_2O_3$ | 4.70 | 28.94 | 15.56 |
| Total | 97.1–99.59 | 99.94 | 99.34 |

Example I

SLAG 3

One hundred gram samples were ground to —325 mesh and leached with 500 grams of 90% $H_2SO_4$ at 215° C. for varying periods. The slurry was filtered and the separated solids leached with 500 milliliters of 20% $H_2SO_4$ for thirty (30) minutes at boiling (105° C.). Extraction ranged from 98.9% for the three-quarter hour leach to 99.5% for the three (3) hour leach. The results of this study are shown as tests 1 to 3 in Table II.

Example II

SLAG 3

Two (2) 100 gram samples were treated as in Example I except that grinding was only to —100 mesh; samples were leached for three-quarters of an hour and 1½ hours and extraction ranged from 94.6% to 96.0%. Two additional samples were leached for three-quarters of an hour, filtered, and leached in (a) 500 milliliters of water for 30 minutes at 80° C., and (b) 500 milliliters of 5% $H_2SO_4$ for 30 minutes at 80° C. In both of these tests the extraction was 97.8%. The results of these tests are reported in Table II as tests 4 to 7.

Example III

SLAG 3

Two (2) 100 grams samples were treated as in Example I except that grinding was to —200 mesh; samples were leached for three-quarters of an hour and 1½ hours, and extraction ranged from 91.4% to 95.8%. The results of these studies are presented in Table II in tests 8 and 9.

Example IV

"STRATEGIC-UDY" SLAGS

Ten (10) different high-titania slags resulting from "Strategic-Udy" selective iron recovery smelting operations were treated according to the process of the invention. Titania content ranged from 53% to 63%. All samples (100 grams) were ground to —100 mesh, and leached with 500 grams of 90% $H_2SO_4$ for three-quarters of an hour at 215° C. After filtration, the separated solids were leached with 500 milliliters of water at 80° C. for ½ hour. The insoluble residue was washed with 100 milliliters of hot water which was thereafter added to the filtrate. Both the insoluble residue and the solution were analyzed for contained titania so as to provide a complete account of titania distribution. Recovery of titania in the solution ranged from 95.1% to 98.1%, and averaged 97.2%. Complete results for these studies are reported in Table III as tests 1 to 10.

Example V

MISCELLANEOUS MATERIALS

Samples of six (6) different ores and slags were treated according to the process of the invention, along with two additional samples of Slag 3. Titania content ranged from 1.33% to 72%. Leaching conditions were varied over the ranges heretofore described, and extraction of titania ranged from 90.3% to 99.5%, averaging 95.5%. Complete results of these studies are given in Table III as tests 11 to 17.

TABLE II.—TESTS ON SLAG 3

| Test No. | Wt. of acid, gm. | Conc. of acid, H₂SO₄, Percent | Step 1 | | | Step 2 | Percent extraction of TiO₂ |
|---|---|---|---|---|---|---|---|
| | | | Conc. acid leach | | | Dilute acid leach | |
| | | | Mesh | Time, hr. | Temp., °C. | | |
| 1 | 500 | 90 | −325 | ¾ | 215 | 500 ml. 20% H₂SO₄ for 30 minutes at boiling. | 98.9 |
| 2 | 500 | 90 | −325 | 1½ | 215 | ___do___ | 99.2 |
| 3 | 500 | 90 | −325 | 3 | 215 | ___do___ | 99.5 |
| 4 | 500 | 90 | −100 | ¾ | 215 | ___do___ | 94.6 |
| 5 | 500 | 90 | −100 | 1½ | 215 | ___do___ | 97.0 |
| 6 | 500 | 90 | −100 | ¾ | 215 | 500 ml. H₂O—30 minutes —80° C. | 97.8 |
| 7 | 500 | 90 | −100 | ¾ | 215 | 500 ml. 5% H₂SO₄—30 minutes —80° C. | 97.8 |
| 8 | 500 | 90 | −200 | ¾ | 215 | 500 ml. 20% H₂SO₄ for 30 minutes at boiling. | 91.4 |
| 9 | 500 | 90 | −200 | 1½ | 215 | ___do___ | 95.8 |

TABLE III.—TiO₂ EXTRACTION FROM VARIOUS RAW MATERIALS

| Test No. | Feed | | | Concentrated leach | | | |
|---|---|---|---|---|---|---|---|
| | 100 gm. samples (except slag 2, 50 gm.) | | | Grams H₂SO₄ | Percent H₂SO₄ | Temp., °C | Time hours |
| | Material | Grams TiO₂ | Mesh size | | | | |
| 1 | Strategic-Udy slag | 63.57 | −100 | 500 | 90 | 215 | ¾ |
| 2 | ___do___ | 57.20 | −100 | 500 | 90 | 215 | ¾ |
| 3 | ___do___ | 53.42 | −100 | 500 | 90 | 215 | ¾ |
| 4 | ___do___ | 60.33 | −100 | 500 | 90 | 215 | ¾ |
| 5 | ___do___ | 60.50 | −100 | 500 | 90 | 215 | ¾ |
| 6 | ___do___ | 58.43 | −100 | 500 | 90 | 215 | ¾ |
| 7 | ___do___ | 61.40 | −100 | 500 | 90 | 215 | ¾ |
| 8 | ___do___ | 53.07 | −100 | 500 | 90 | 215 | ¾ |
| 9 | ___do___ | 56.97 | −100 | 500 | 90 | 215 | ¾ |
| 10 | ___do___ | 59.27 | −100 | 500 | 90 | 215 | ¾ |
| 11 | Slag 3 | 62.85 | −325 | 500 | 90 | 215 | 3 |
| 12 | Slag 1 | 72.00 | −100 | 500 | 90 | 215 | ¾ |
| 13 | Slag 2 | 25.96 | −100 | 200 | 97 | 250 | 3 |
| 14 | Ilmenite ore | 52.14 | −200 | 500 | 90 | 215 | 3 |
| 15 | Low-Ti Slag | 36.19 | −200 | 500 | 90 | 215 | 3 |
| 16 | Low-Ti Ore | 1.33 | −200 | 1,000 | 90 | 215 | 3 |
| 17 | Slag 3 | 62.85 | −100 | 500 | 90 | 215 | ¾ |

| Test No. | Dilute leach | | | | Residue | | | TiO₂ extraction | |
|---|---|---|---|---|---|---|---|---|---|
| | Grams liquor | Percent H₂SO₄ | Temp., °C. | Time, hours | Grams, Total | Percent TiO₂ | Grams, TiO₂ | Grams, TiO₂ | Percent Extracted |
| 1 | 500 | 0 | 80 | ½ | 20.6 | 6.51 | 1.34 | 62.32 | 97.9 |
| 2 | 500 | 0 | 80 | ½ | 23.1 | 8.22 | 1.90 | 55.30 | 96.7 |
| 3 | 500 | 0 | 80 | ½ | 25.9 | 10.12 | 2.62 | 50.80 | 95.1 |
| 4 | 500 | 0 | 80 | ½ | 18.45 | 6.35 | 1.17 | 59.16 | 98.1 |
| 5 | 500 | 0 | 80 | ½ | 12.25 | 13.09 | 1.60 | 58.90 | 97.4 |
| 6 | 500 | 0 | 80 | ½ | 18.1 | 6.92 | 1.25 | 57.18 | 97.9 |
| 7 | 500 | 0 | 80 | ½ | 22.4 | 12.35 | 2.77 | 58.63 | 95.5 |
| 8 | 500 | 0 | 80 | ½ | 22.3 | 6.32 | 1.41 | 51.66 | 97.3 |
| 9 | 500 | 0 | 80 | ½ | 16.8 | 7.27 | 1.22 | 55.75 | 97.9 |
| 10 | 500 | 0 | 80 | ½ | 22.1 | 5.95 | 1.31 | 57.96 | 97.8 |
| 11 | 600 | 20 | 110 | 1 | 6.1 | 5.96 | 0.34 | 62.51 | 99.5 |
| 12 | 515 | 5 | 105 | ½ | 12.8 | 29.4 | 3.76 | 68.24 | 94.8 |
| 13 | 285 | 20 | 110 | 1 | 8.3 | 7.94 | 0.66 | 25.30 | 97.5 |
| 14 | 500 | 0 | 105 | 1 | 12.2 | 41.3 | 5.04 | 47.10 | 90.3 |
| 15 | 500 | 0 | 105 | 1 | 45.8 | 4.4 | 2.02 | 34.18 | 94.5 |
| 16 | 500 | 0 | 105 | 1 | 74.2 | 0.11 | 0.08 | 1.25 | 94.0 |
| 17 | 500 | 0 | 80 | ½ | 13.1 | 10.34 | 1.35 | 61.50 | 97.8 |

I claim:

1. A process for recovering titania from materials selected from the group consisting of titania-bearing ores, slags, and residues, that comprises leaching said material in ground form with concentrated sulfuric acid of at least 80 percent concentration at an elevated temperature no higher than the boiling point of said acid, said acid being present in an amount sufficient to react with the total titania content of said material and produce a readily filterable acid slurry of sulfates of the contained titanium of said material, separating said sulfates from the acid, thereafter leaching said sulfates in a dilute sulfuric acid solution of no more than about 20 percent concentration capable of dissolving said titanium sulfates and leaving insoluble materials as a solid residue, said dilute solution being so constituted so as to establish and maintain an acid:titania ratio of at least two parts by weight of acid to each part by weight of titania and said leach being carried out below the boiling point of the solution, thereafter separating said solution from said solid residue, and further treating said solution for the production and recovery of titania.

2. The process as claimed in claim 1, wherein the solution of titanium sulfates is treated with a reducing agent before separation from said solid residue to effect the reduction and precipitation of contained iron therefrom.

3. The process as claimed in claim 1, wherein said elevated temperature is within the range of from 200° C. to 230° C.

4. The process as claimed in claim 1, wherein said concentrated acid leach is continued for up to three (3) hours.

5. The process as claimed in claim 1, wherein said dilute acid leach is continued for up to one (1) hour.

6. The process as clamed in claim 1, wherein said dilute acid solution comprises residual concentrated acid contained in said slurry, and added water.

7. A process for recovering titania from materials selected from the group consisting of titania-bearing ores, slags, and residues, that comprises leaching said material in ground form with concentrated sulfuric acid of at least 80 percent concentration at an elevated temperature maintained no higher than the boiling point of said acid, said acid being present in at least twice the stoichiometric amount required to react with the total titania content of said material, said leach acting to produce a readily filterable slurry of sulfates of the contained titanium in said acid, separating said sulfates from said acid, thereafter leaching said sulfates in a dilute sulfuric acid solution of no more than about 20 percent concentration capable of dissolving said titanium sulfates and leaving insoluble materials as a solid residue, said dilute solution being so constituted as to establish and maintain an acid:titania ratio of at least two (2) parts by weight of acid to each part by weight of titania and said leach being carried out below the boiling point of the solution, thereafter separating said solution from said solid residue, and further treating said solution for the production and recovery of itania.

8. The process as claimed in claim 7, wherein the solution of titanium sulfates is treated with a reducing agent before separation from said solid residue to effect the reduction and precipitation of contained iron therefrom.

9. The process as claimed in claim 7, wherein said elevated temperature is within the range of from 200° C. to 230° C.

10. The process as claimed in claim 7, wherein said concentrated acid leach is contained for up to three (3) hours.

11. The process as claimed in claim 7, wherein said dilute acid leach is continued for up to one (1) hour.

12. The process as claimed in claim 7, wherein said dilute acid solution comprises residual concentrated acid contained in said slurry, and added water.

References Cited by the Examiner

UNITED STATES PATENTS

| | | | |
|---|---|---|---|
| 1,504,669 | 8/1924 | Blumenfeld | 23—202 |
| 1,613,234 | 1/1927 | Mackey | 23—202 |
| 2,089,180 | 8/1937 | Bousquet | 23—202 X |
| 2,361,987 | 11/1944 | Booge | 23—202 |
| 2,413,641 | 12/1946 | McAdam | 23—202 |

FOREIGN PATENTS 203,352   9/1923   Great Britain.

MAURICE A. BRINDISI, *Primary Examiner.*

UNITED STATES PATENT OFFICE
CERTIFICATE OF CORRECTION

Patent No. 3,218,131 November 16, 1965

Robert W. Grose

It is hereby certified that error appears in the above numbered patent requiring correction and that the said Letters Patent should read as corrected below.

Column 3, line 8, after "to" insert -- be --; line 60, for "thep rinciples" read -- the principles --; column 7, line 8, for "clamed" read -- claimed --; column 8, line 10, for "contained" read -- continued --.

Signed and sealed this 20th day of September 1966.

(SEAL)
Attest:

ERNEST W. SWIDER
Attesting Officer

EDWARD J. BRENNER
Commissioner of Patents